United States Patent [19]
Kim

[11] Patent Number: 6,052,169
[45] Date of Patent: Apr. 18, 2000

[54] LIQUID CRYSTAL DISPLAY DEVICE HAVING AN EQUIPOTENTIAL ELECTRODE STRUCTURE

[75] Inventor: Byung-hee Kim, Seoul, Rep. of Korea

[73] Assignee: Samsung Display Devices Co., Ltd., Kyungki-do, Rep. of Korea

[21] Appl. No.: 08/998,522

[22] Filed: Dec. 26, 1997

[30] Foreign Application Priority Data

Dec. 27, 1996 [KR] Rep. of Korea ................... 96-59112

[51] Int. Cl.[7] ................... G02F 1/1343; G02F 1/1345
[52] U.S. Cl. ................... 349/148; 349/139; 349/143; 349/149; 349/152; 669/126; 455/129
[58] Field of Search ................... 349/148, 143, 349/149, 152, 139; 369/126; 455/129

[56] References Cited

U.S. PATENT DOCUMENTS

| | | | |
|---|---|---|---|
| 4,199,782 | 4/1980 | Wada et al. | 455/129 |
| 4,497,052 | 1/1985 | Wada et al. | 369/126 |
| 5,323,252 | 6/1994 | Yoshida et al. | 359/54 |
| 5,499,131 | 3/1996 | Kim | 359/88 |
| 5,555,116 | 9/1996 | Ishikawa et al. | 359/88 |
| 5,825,450 | 10/1998 | Date et al. | 349/149 |

*Primary Examiner*—William L. Sikes
*Assistant Examiner*—Julie Ngo
*Attorney, Agent, or Firm*—Christie, Parker & Hale, LLP

[57] ABSTRACT

A liquid crystal display device is provided with an equipotential electrode structure. The device has a first substrate, a second substrate which is parallel to the first substrate, a number of sets of common electrodes formed on the first substrate and for receiving a voltage from a common electrode driving circuit, and a number of sets of segment electrodes formed on the second substrate and receiving a voltage from a segment electrode driving circuit. The resistance of leading parts of the segment electrodes or the common electrodes are gradually changed.

12 Claims, 6 Drawing Sheets

LIQUID CRYSTAL DISPLAY DEVICE HAVING AN EQUIPOTENTIAL ELECTRODE STRUCTURE

FIELD OF THE INVENTION

The present invention relates to a liquid crystal display device having an equipotential electrode structure which prevents voltage differences on the electrodes, and thereby produces a more uniform contrast on the display screen.

DESCRIPTION OF THE RELATED ART

A liquid crystal display device, which is generally used as a display device, displays an image on its screen by using the electro-optical properties of a liquid crystal. The liquid crystal display (LCD) device includes a pair of substrates, a set of common electrodes formed on one substrate and a set of segment electrodes formed on the other substrate, and a liquid crystal compound injected between the common and segment electrodes. The common electrodes are formed on one substrate perpendicular to the segment electrodes formed on the other substrate, and the common electrodes and segment electrodes are driven by a common electrode driving circuit and a segment electrode driving circuit, respectively.

These electrodes are conventionally made of Indium Tin Oxide (ITO) having a characteristic resistance. Due to the resistance of the ITO, there is an inevitable voltage drop across the ITO electrode, and the longer the ITO electrode, the greater the voltage drop. This voltage drop results in a non-uniform contrast on the display screen between the left and the right regions and between the upper and the lower regions. Furthermore, the voltage supplied to each electrode is different from each other because the lengths of leading parts of each electrode is different from each other. To make up for the difference in lengths of the leading parts, the widths of the leading parts of the ITO electrodes are varied so that the leading parts can have a uniform resistance regardless of their lengths, as shown in FIG. 7a. However, the contrast of a large size liquid crystal display screen still lacks uniform contrast due to the voltage drop on the electrode. In the large size liquid crystal display device, a longer electrode is used, and the voltage drop due to the long electrode causes more serious problems in the contrast of the display screen.

SUMMARY OF THE INVENTION

Accordingly, an embodiment of the present invention is directed to a liquid crystal display device having an electrode structure which substantially obviates one or more of the problems due to the limitations and disadvantages of the related art. An object of an embodiment of the present invention is to provide a liquid crystal display device having an equipotential electrode structure. A further object of an embodiment of the present invention is to provide a large size liquid crystal display device having an electrode structure for uniform display contrast by preventing voltage differences on its electrodes.

To achieve the above described objects, an embodiment of the present invention includes a liquid crystal display device having an electrode structure in which the resistance of the leading parts of the electrodes are changed gradually so that the voltages on the leading parts can also be dropped gradually. The resistance of each leading part can be changed by changing the width or the length of the leading part. Specifically, an embodiment of the present invention includes a liquid crystal display device having an electrode structure with a first substrate and a second substrate parallel to the first substrate. A number of sets of common electrodes are formed on the first substrate and receive a first voltage from a common electrode driving circuit. A number of sets of segment electrodes are formed on the second substrate and receive a second voltage from a segment electrode driving circuit. The resistance of leading parts of the segment electrodes or the common electrodes are gradually changed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of the present invention will become apparent from a study of the following detailed description with reference to the accompanying drawings.

Figure 1:
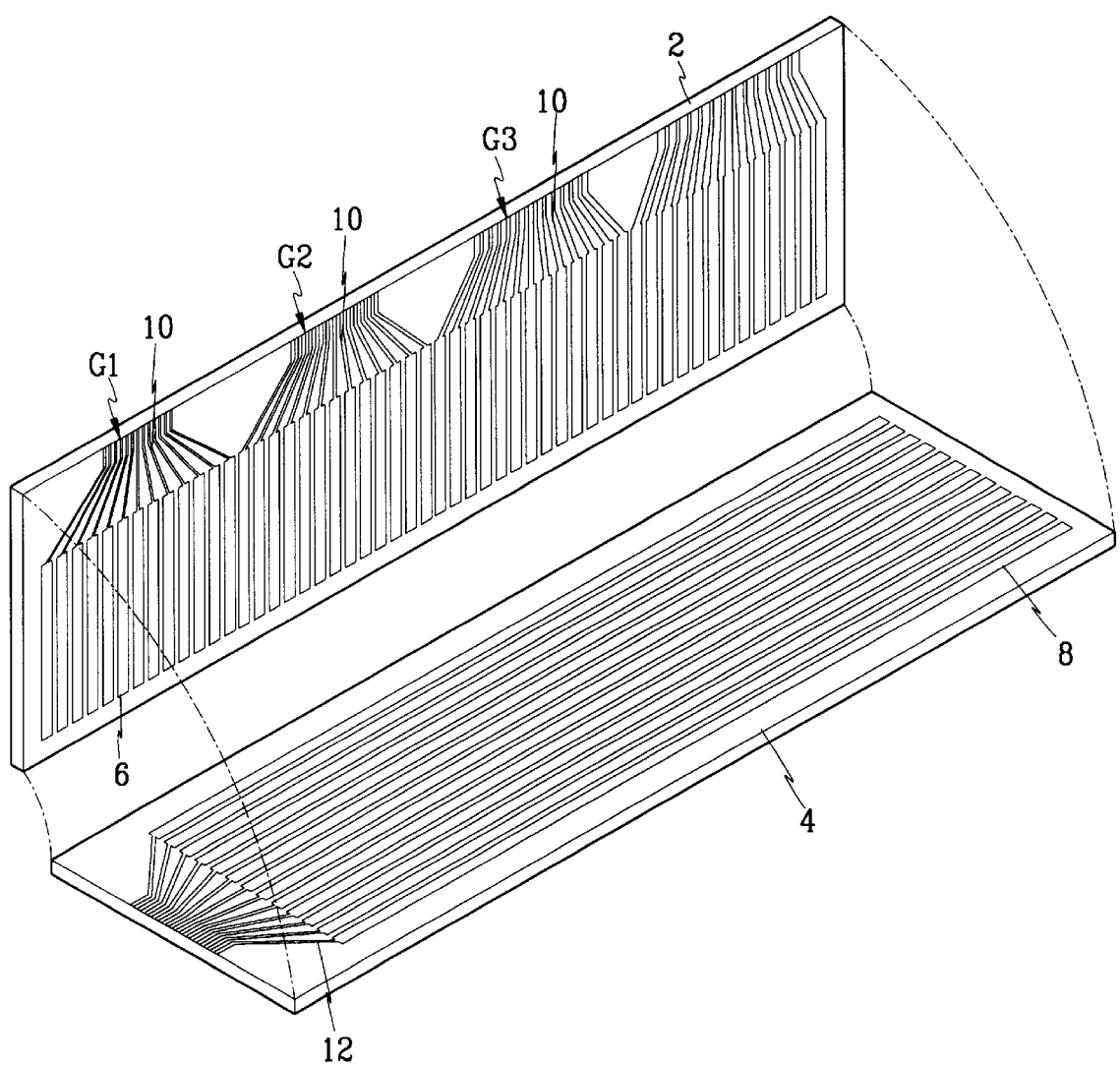
FIG. 1 is a perspective view showing common and segment electrodes on substrates according to an embodiment of the present invention.

As shown in FIG. 1, the large size liquid crystal display (LCD) device includes an upper substrate 2 and a lower substrate 4. A plurality of sets of segment electrodes 6 and a plurality of sets of common electrodes 8 are formed on the upper substrate 2 and the lower substrate 4, respectively. That is, the segment electrodes 6 consist of a plurality of sets of the electrodes, the sets of the segment electrodes 6 being shown in FIG. 1 as the first electrode set G1, the second electrode set G2 and the third electrode set G3 and so on. The electrode structure of FIG. 1 is particularly suitable for the large size liquid crystal display device.

Figure 6:
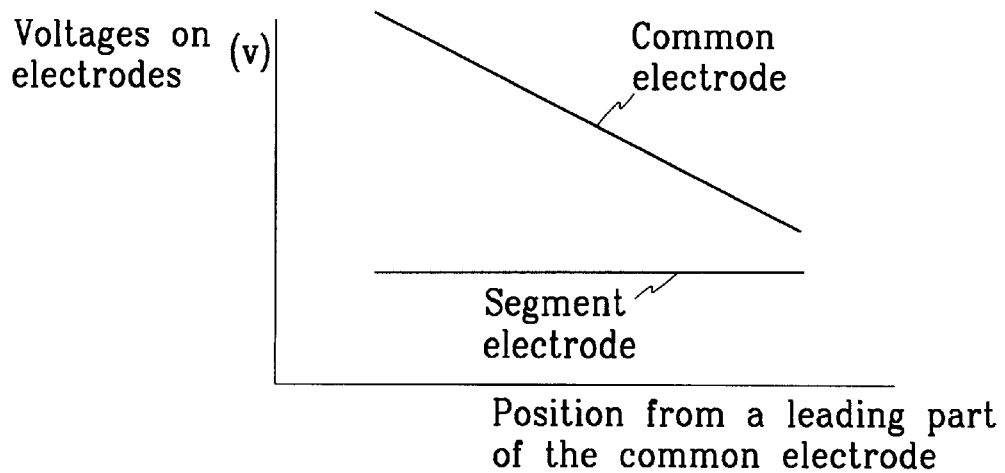
FIG. 6 is a graph showing the voltage variation of the common and the segment electrodes at various positions of the electrode(distances from a leading part of the common electrode) of the conventional liquid crystal display device.

As shown in FIG. 6, the voltage on a common electrode 8 varies in accordance with the distance from the leading part 12 of the electrode 8, and the voltages on the segment electrodes 6 on the common electrode 8 are constant since the distances of the segment electrodes 6 from the leading parts 10 of the segment electrodes 6 to the common electrode 8 are the same.

Figure 2:
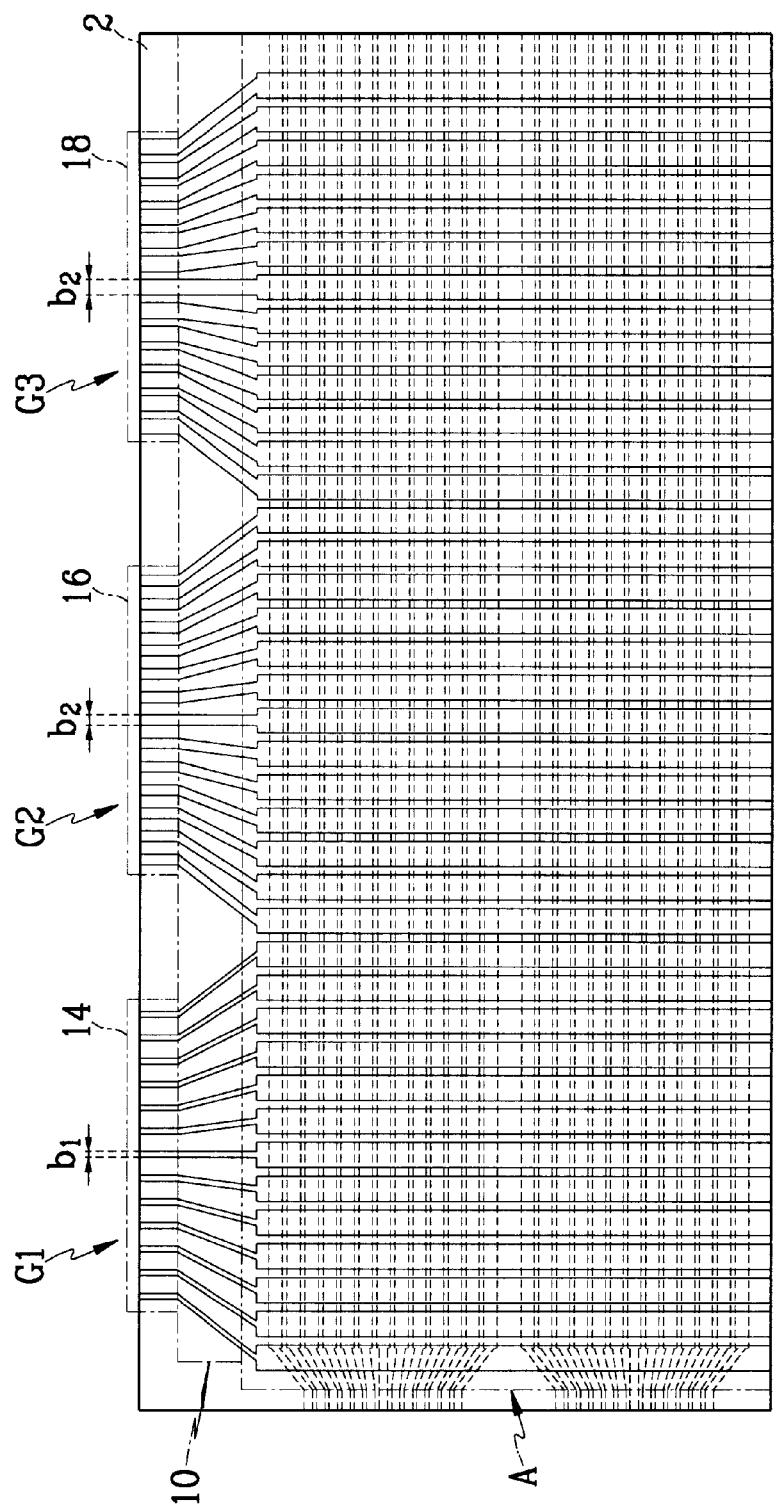
FIG. 2 is a plan view showing the segment electrodes on a substrate according to an embodiment of the present invention.

Specifically, the common electrode 8 forms a plurality of cells with the segment electrodes crossing the common electrode 8. Then the voltage differences of cells formed by the common electrode 8 and the segment electrodes 6 are gradually reduced as the cell is formed at a further position from the leading parts 12 of the common electrode 8. As shown in FIG. 6, if the resistance of the leading parts of the electrodes are same, the voltage of the common electrode is rapidly decreased. In an embodiment of the present invention, the resistance of the leading parts 10 of the segment electrodes 6 are varied to compensate for the voltage drop on the common electrode. The variations in resistance is performed by changing the widths and/or the lengths of the leading parts 10, since the resistance of a material is proportional to the length of the material and inversely proportional to the width of the material. As shown in FIG. 2, the leading parts are formed between the segment electrode driving circuit regions 14, 16, 18 and an active region A of the segment electrodes 6. The active region A of the segment electrodes 6 forms pixels with the common electrodes 8. With the electrode structure of FIG. 2, the leading parts 10 at the center portion of a set of electrodes are shorter than those at the edge portions of the set of electrodes. In this structure, the widths of the leading parts are changed so as to vary the resistance of the leading parts gradually.

Figure 5:
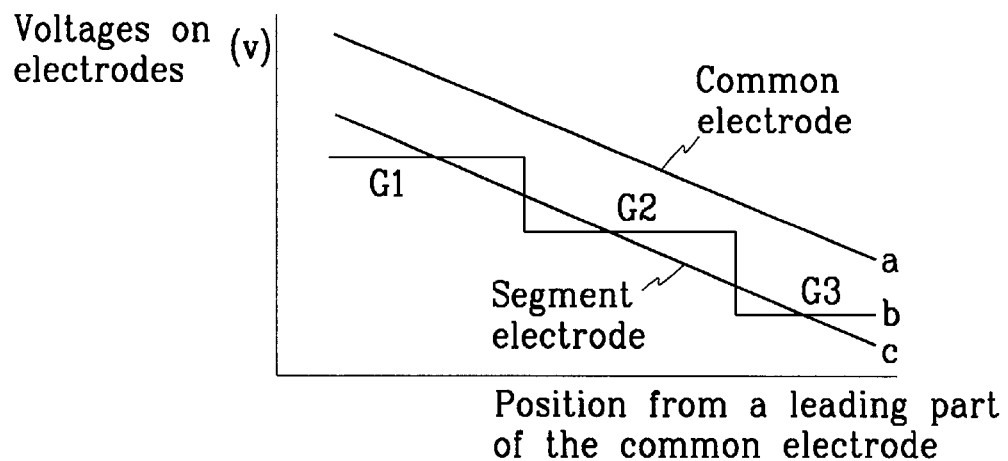
FIG. 5 is a graph showing the voltage variation of the common and segment electrodes at various positions of the electrode (distances from a leading part of the common electrode) according to an embodiment of the present invention.

According to a first embodiment of the present invention, as shown in FIG. 2, the leading parts of the first electrode set G1 have same widths b1, but the widths b2 and b3 of the leading parts of the second and the third electrode sets G2, G3 are different from the b1 width to compensate for the voltage drop on the common electrodes. That is, the width b1 of a leading part of the first electrode set G1, the width b2 of a leading part of the second electrode set G2, and the width b3 of a leading part of the third electrode set G3 have the relation of b1<b2<b3. This results in a resistance r1, r2 and r3 of the leading parts of the first, second and the third set of electrodes G1, G2, G3 having the relation of r1>r2>r3. Therefore, the voltage differences formed between the common electrodes and the first set of the segment electrodes G1 is same as those formed between the common electrodes and the second G2 or third G3 set of segment electrodes. In other words, the voltage differences formed between the common electrodes and the first, second and third sets of the segment electrodes are maintained within 0.001V. Therefore, by calculating and changing the resistance of the ITO leading parts with reference to its width and length, the voltage difference between the segment and the common electrodes can be maintained to be approximately constant, as shown in FIG. 5. In FIG. 5, the reference character "a" represents the voltage on the common electrode, and the reference character "b" represents the voltage on the sets of segment electrodes G1, G2, G3.

Figure 3:
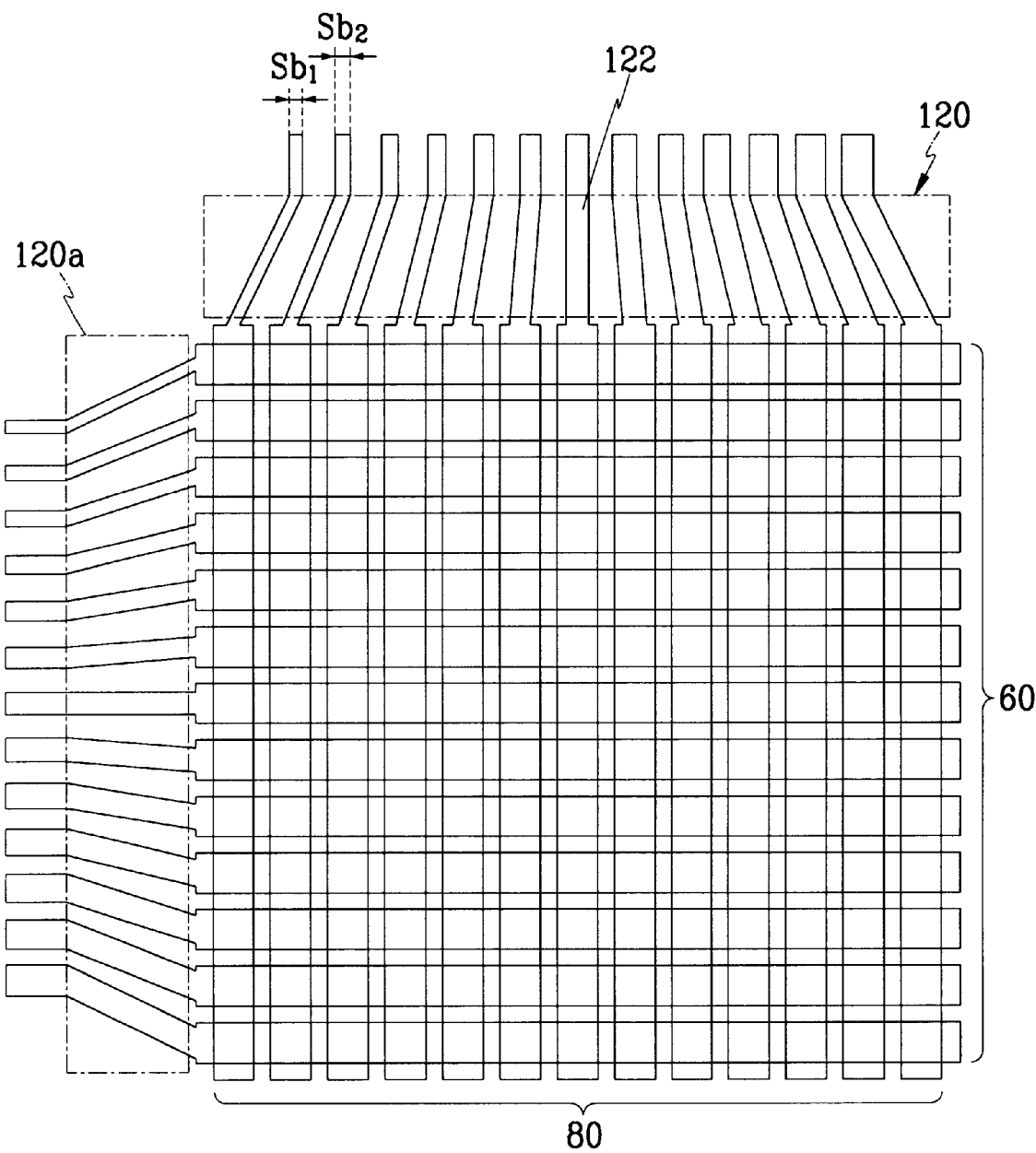
FIG. 3 is a plan view showing the common and segment electrodes according to another embodiment of the present invention.
Figure 7A:
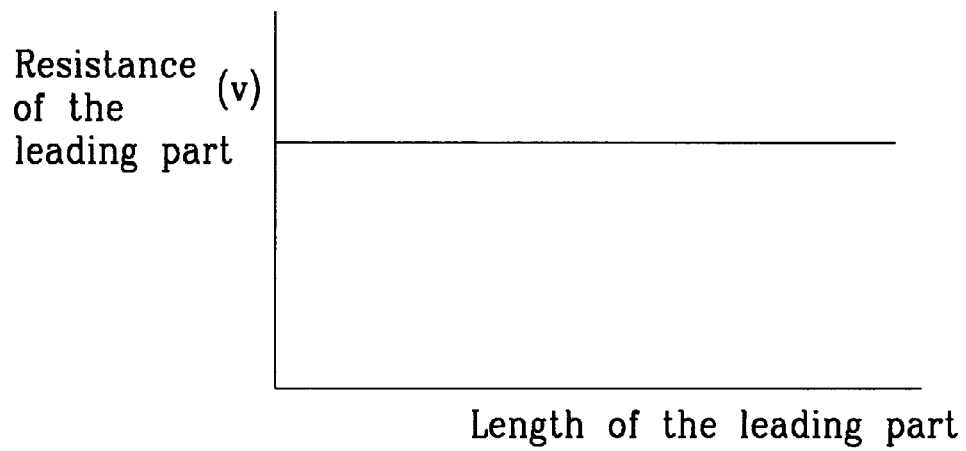
FIG. 7a is a graph showing the resistance of the leading part with respect to the lengths of the leading part of the electrode of the conventional liquid crystal display device.
Figure 7B:
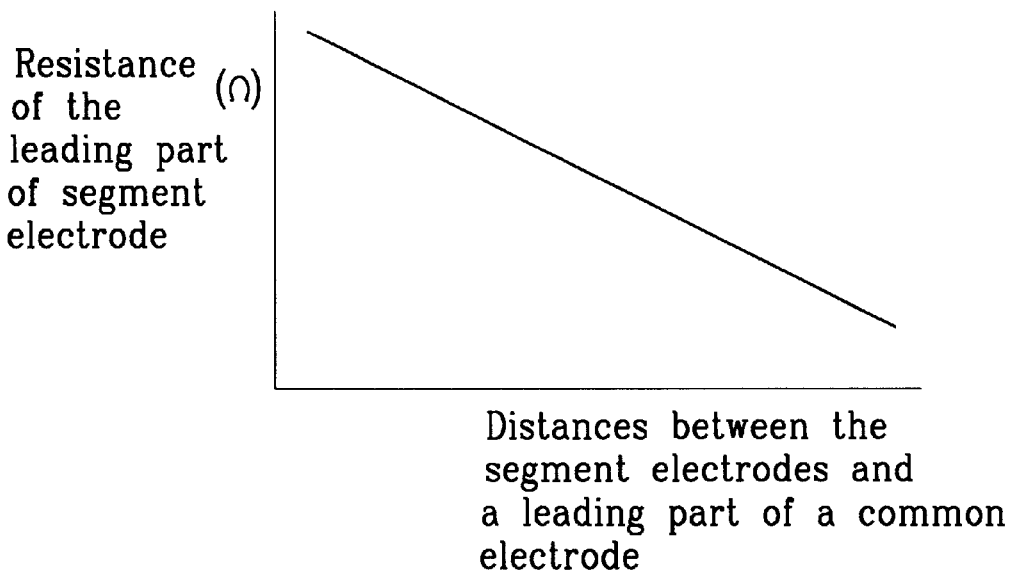
FIG. 7b is a graph showing the resistance of the leading part of the segment electrode with respect to the distance between the segment electrodes and a leading part of a common electrode according to an embodiment of the present invention.

A second embodiment of this invention will be described with reference to FIG. 3. In this embodiment, each leading part of an electrode in a set of electrodes is modified to form equipotential cells. In FIG. 3, the reference numerals 60 and 80 represent the common electrodes and the segment electrodes, respectively, and the substrates are not drawn. In the electrode structure of FIG. 3, a voltage applied to a cell formed at a cross section of common electrode and the segment electrode is lowered as the cell is formed at a further position from the leading parts 120a, 120 of the common and segment electrodes 60, 80. In this embodiment, the resistance of the leading parts 120 are gradually decreased by increasing the widths of the leading parts gradually from the position of the leading part 120a (see FIG. 2 and FIG. 7b). Namely, the width of Sb1 is less than the width of Sb2 to compensate for the voltage drop on the segment electrode 60.

Figure 4:
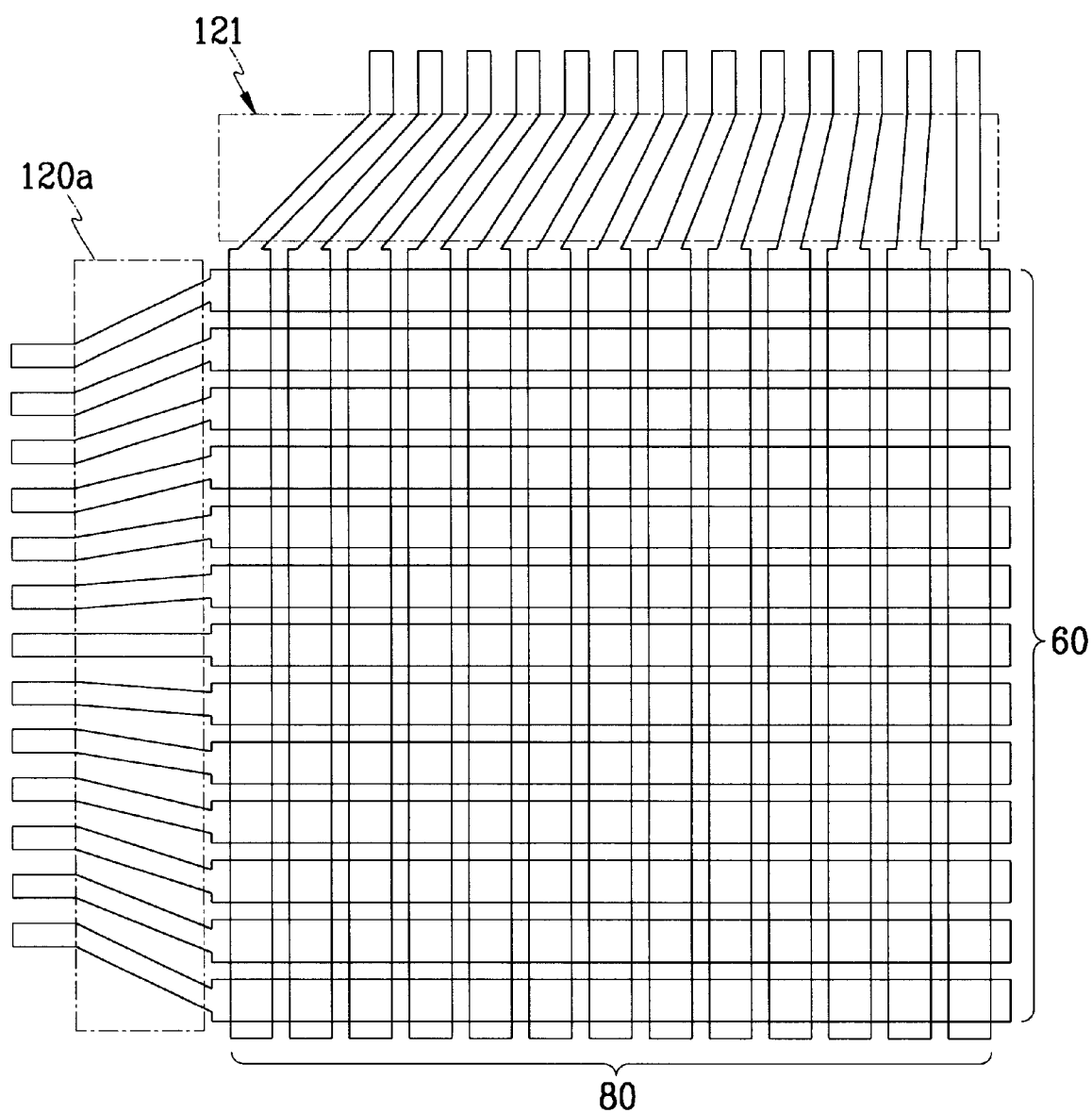
FIG. 4 is a plan view showing the common and segment electrodes according to another embodiment of the present invention.

A third embodiment of this invention will be described with reference to FIG. 4. In this embodiment, a pattern of the leading parts 121 of electrodes in a set of electrodes are modified to form equipotential cells. In FIG. 4, the reference numerals 60 and 80 represent the common electrodes and segment electrodes, respectively, and the substrates are not drawn. In the electrode structure of FIG. 4, a voltage applied to a cell formed at a cross section of a common electrode and a segment electrode is reduced as the cell is formed at a further position from the leading parts 120a, 121 of the common and the segment electrodes 60, 80. In this embodiment, the resistance of the leading parts 121 are gradually decreased by decreasing the lengths of the leading parts gradually. Then the voltage difference between the segment and the common electrodes can be maintained to be approximately constant, as shown in FIG. 5. In FIG. 5, the reference character "a" represents the voltage on the common electrode, and the reference character "c" represents the voltage on the segment electrode of this embodiment.

With the first, second and third embodiments, the leading parts of the segment electrodes are changed to form equipotential cells between the 20 segment electrodes and common electrodes, but the same effect can be easily achieved by changing the leading parts of the common electrodes. That is, by changing the leading parts of the common electrodes, the voltage drop which occurs at a cell formed at a further position from the leading parts of the segment electrodes can be compensated. In addition, both the leading parts of the segment electrodes and the common electrodes can be changed to form the equipotential cell. Therefore, the voltage drop resulting from the segment electrodes can be compensated by changing the resistance of the leading parts of the common electrodes, and the voltage drop resulting from the common electrodes can be compensated by changing the resistance of the leading parts of the segment electrodes. The changing of the resistance of the leading parts of the electrodes can be performed to each electrode as shown in the second and third embodiments, and can also be performed to the sets of electrodes as shown in the first embodiment.

What is claimed is:

1. A liquid crystal display device having an equipotential electrode structure, comprising:

a plurality of first electrodes each having a first leading part with a resistance; and a plurality of second electrodes substantially perpendicular to and spaced apart from said first electrodes to form a plurality of display cells, each of the second electrodes having a second leading part with a resistance, the resistance of the second leading parts progressively decreasing as a distance between the second electrodes and the first leading parts increases.

2. A liquid crystal display device according to claim 1 wherein the second leading parts have a wider width as the distance between the second electrodes and the first leading parts increases.

3. A liquid crystal display device according to claim 1 wherein the second leading parts have a shorter length as the distance between the second electrodes and the first leading parts increases.

4. A liquid crystal display device according to claim 1 wherein the second leading parts have a wider width and shorter length as the distance between second electrodes and the first leading parts increases.

5. A liquid crystal display device having an equipotential electrode structure, the device comprising:

a first substrate;

a second substrate substantially parallel to the first substrate;

a plurality of sets of first electrodes formed on the first substrate for receiving a first voltage from a first electrode driving circuit, each of the first electrodes having a leading part with a resistance, the resistance of each of the leading parts of the first electrodes being substantially identical to the other leading parts in its respective set; and a plurality of second electrodes formed on the second substrate for receiving a second voltage from a second electrode driving circuit, each of the second electrodes being substantially perpendicular to the first electrodes and having a leading part with a resistance, wherein the resistance of the leading parts of each of the sets of first electrodes progressively decreases with respect to the other sets of first electrodes as a distance between such sets of first electrodes and the leading parts of the second electrodes increases.

6. A liquid crystal display device according to claim 5 wherein the leading parts of each of the sets of first electrodes have a progressively wider width with respect to the other sets of first electrodes as the distance between such sets of first electrodes and the leading parts of the second electrodes increases.

7. A liquid crystal display device according to claim 5 wherein the leading parts of each of the sets of first electrodes have a progressively shorter length with respect to the other sets of first electrodes as the distance between such sets of first electrodes and the leading parts of the second electrodes increases.

8. A liquid crystal display device according to claim 5 wherein the leading parts of each of the sets of first electrodes have a progressively shorter length with respect to the other sets of first electrodes and a progressively wider width with respect to the other sets of first electrodes as the distance between such sets of first electrodes and the leading parts of the second electrodes increases.

9. A liquid crystal display device having an equipotential electrode structure, the device comprising:

a first substrate;

a second substrate substantially parallel to the first substrate;

a plurality of common electrodes formed on the first substrate for receiving a first voltage from a common electrode driving circuit, each of the common electrodes having a leading part with a resistance; and a plurality of segment electrodes formed on the second substrate for receiving a second voltage from a segment electrode driving circuit, each of the segment electrodes being substantially perpendicular to the common electrodes and having a leading part with a resistance, wherein the resistance of the leading parts of the segment electrodes or the common electrodes progressively decreases as a distance between the segment electrodes or common electrodes and the leading parts of the perpendicularly-disposed common electrodes or segment electrodes increases.

10. A liquid crystal display device according to claim 9 wherein the leading parts of the segment electrodes or the common electrodes have a wider width as the distance between the segment electrodes or common electrodes and the leading parts of the perpendicularly-disposed common electrodes or segment electrodes, respectively, increases.

11. A liquid crystal display device according to claim 9 wherein the leading parts of the segment electrodes or the common electrodes have a shorter length as the distance between the segment electrodes or common electrodes and the leading parts of the perpendicularly-disposed common electrodes or segment electrodes, respectively, increases.

12. A liquid crystal display device according to claim 9 wherein the leading parts of the segment electrodes or the common electrodes have a wider width and shorter length as the distance between the segment electrodes or the common electrodes and the leading parts of the perpendicularly disposed common electrodes or segment electrodes, respectively, increases.

* * * * *